United States Patent [19]

Eloranta et al.

[11] 3,757,657
[45] Sept. 11, 1973

[54] MANUALLY OPERABLE FILM-ADVANCING APPARATUS

[75] Inventors: Vaito K. Eloranta, Needham; Benjamin C. Ruggles, Gloucester, both of Mass.

[73] Assignee: Polaroid Corporation, Cambridge, Mass.

[22] Filed: Mar. 27, 1972

[21] Appl. No.: 238,083

[52] U.S. Cl. ................................................. 95/13
[51] Int. Cl. .......................................... G03b 17/52
[58] Field of Search ............................. 95/13, 19, 22

[56] References Cited
UNITED STATES PATENTS

| | | | |
|---|---|---|---|
| 3,618,493 | 11/1971 | Erlichman.............................. | 95/13 |
| 3,691,920 | 9/1972 | Harvey................................... | 95/13 |
| 3,320,865 | 5/1967 | Good...................................... | 95/13 |
| 641,268 | 6/1900 | Chase..................................... | 95/30 |

Primary Examiner—Samuel S. Matthews
Assistant Examiner—Alan Mathews
Attorney—Alfred E. Corrigan et al.

[57] ABSTRACT

Photographic apparatus including film-engaging apparatus mounted in position to engage a thin, flexible film unit near its trailing end and move it, subsequent to exposure, into the bite of a pair of pressure-applying members. The pressure-applying members rupture a container of processing liquid located near a leading end of the film unit and spread the processing liquid across a photo-sensitive element of the film unit while simultaneously continuing the movement of the film unit toward the exterior of the photographic apparatus. The film-engaging apparatus and at least one of the pressure-applying members are driven by a manually operated crank. Rotation of the crank is limited, by a pivotally mounted stop, to that which is necessary to advance the exposed film unit out of engagement with the pressure-applying members. The stop is temporarily rendered inoperative by actuation of a shutter release button to enable rotation of the crank to advance the next succeeding exposed film unit. Rotation of the crank, subsequent to actuation of the shutter release, is effective to recock the shutter of the photographic apparatus.

10 Claims, 3 Drawing Figures

3,757,657

MANUALLY OPERABLE FILM-ADVANCING APPARATUS

BACKGROUND OF THE INVENTION

1. Field of the Invention

Photographic apparatus of the self-developing type having manually operated film-advancing apparatus.

2. Description of the Prior Art

Photographic apparatus of the self-developing type are generally provided with film-advancing apparatus which are either driven by a source of energy, e.g., a battery operated motor, or are driven manually. While film-advancing apparatus of the former type may have certain advantages as regard manually operated film-advancing apparatus, they also have numerous disadvantages, e.g., dependence upon a source of energy which may drop to a level whereat it can no longer operate the film-advancing apparatus, thereby possibly resulting in the photographer being unable to expose and process all of the film units located within the photographic apparatus; also, their relative complexity and attendant higher costs place them at an economic disadvantage relative to manually operated film-advancing apparatus. Although photographic apparatus having manually operated film-advancing apparatus obviate the above disadvantages, the state of the art is such that there is a need for a manually operated film-advancing system which will completely process an exposed film unit in response to a single act by the photographer. Generally, the manually operated film-advancing systems presently available require the photographer to perform a series of acts in order to move an exposed film unit out of its exposure position and through a pair of pressure-applying rollers.

SUMMARY OF THE INVENTION

The invention relates to photographic apparatus of the self-developing type and, more particularly to manually operated film-advancing apparatus for moving a film unit, subsequent to exposure, from its exposure position and through a pair of pressure-applying rollers. Specifically, the film-advancing apparatus includes a manually operable crank pivotally mounted on an exterior wall of a camera. The crank is drivingly connected to at least one roller of a pair of superposed rollers by a gear train consisting of a drive gear and a driven gear. The ratio between the drive and driven gears is selected such that one revolution of the crank will drive at least one of the pair of rollers for a period of time sufficient to completely advance a film unit through the bite of the rollers. The film-advancing apparatus further includes a film-engaging member which is adapted to extend into an opening formed in a trailing end wall and forward wall of a film cassette and drivingly engage a trailing end of the foremost film unit therein prior to advancing the film unit, subsequent to exposure, leading end first, through an exit opening in the cassette and into the bite of the rollers. The film-engaging member is mounted within the camera for reciprocating movement toward and away from the rollers. The structure for reciprocally mounting the film-engaging member includes an elongated support member having one of its ends connected to the film-engaging member and its other end formed with a recess for receiving a pin mounted on a face of the drive gear. Rotary motion of the drive gear is effective to transfer linear motion to the elongated support member and film-engaging member for moving the film-engaging member toward the rollers. After the drive gear has been rotated through a predetermined number of degrees, the pin moves out of the recess and the elongated support member and film-engaging member are returned to their original position under the bias of a spring.

The film-advancing apparatus is provided with a pivotally mounted stop which initially engages a land on the crank for preventing rotation of the crank in a direction to drive the film-engaging member. The stop is maintained in its operative, locking position against a spring bias by a plurality of levers which are in turn coupled with the camera's shutter release button. Actuation of the shutter release button is effective to pivot the levers to a position in which the stop is allowed to move to an inoperative position thereby allowing the photographer to turn the crank through 360°. Initial rotation of the crank moves the film-engaging member toward the rollers, at least one of which is now being driven by the crank. As the film-engaging member moves toward the rotating rollers it engages the trailing end of the exposed film unit and moves it, leading end first, through an exit opening in a leading end wall of the cassette and into the bite of the rollers. At this point, the pin on the drive gear leaves the recess in the elongated support member thereby allowing the latter and the film-engaging member to return to their original positions. The rollers continue to advance the exposed film unit away from its exposure position at a rate at least equal to that at which it was being advanced by the film-engaging member thereby preventing buckling of the exposed film unit as it enters the bite of the rollers. The rollers rupture a container of processing liquid located near the leading edge of the exposed film unit and spread the contents thereof across a photosensitive element of the exposed film unit to initiate a diffusion transfer process, as is well known in the art. As the exposed film unit is being advanced through the rollers, its leading end passes through an exit slot in a forward wall of the camera. The exit slot is provided with a flexible member which normally functions as a light seal, but, when deflected by the leading end of the advancing film unit, functions as a means for releasably retaining the film unit after it has moved out of engagement with the rollers. During the latter portion of rotating the crank through 360°, a second pin mounted on the drive gear is rotated into engagement with another pin mounted on one of the levers to move the stop, against its spring bias, into a position wherein it will engage the crank as it completes one revolution, thereby ending the cycle. As noted above, a second cycle cannot be commenced until the stop has been moved to an inoperative position by actuation of the shutter release button. Therefore, rotation of the crank is effective to move only one film unit for each actuation of the shutter release button. Stated another way, operation of the film-advancing apparatus is limited to moving only the foremost exposed film unit in the film cassette. Finally, in order to maximize the efficiency of the camera, a cam is fixedly mounted on the crank shaft and is located in engagement with a shutter recocking arm such that the camera's shutter is recocked during each revolution of the crank.

An object of the invention is to provide photographic apparatus having manually operated film-advancing apparatus for engaging an exposed film unit near a trailing end thereof and advancing the exposed film unit leading end first into engagement with a pair of pressure-applying members.

Another object of the invention is the provision of manually operable film-advancing apparatus having means for limiting the cycle of operation thereof to the advancement of a single exposed film unit.

Another object of the invention is the provision of manually operable film-advancing apparatus requiring only one operation by a user to advance an exposed film unit from its exposure position and through a pair of pressure-applying members.

Another object of the invention is the provision of a camera of the self-developing type having manually operable film-advancing apparatus requiring only one operation by the user to process a previously exposed film unit and deliver the processed film unit to the user.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the invention, reference should be had to the following detailed description taken in connection with the accompanying drawings wherein.

DETAILED DESCRIPTION OF THE INVENTION

Figure 1:
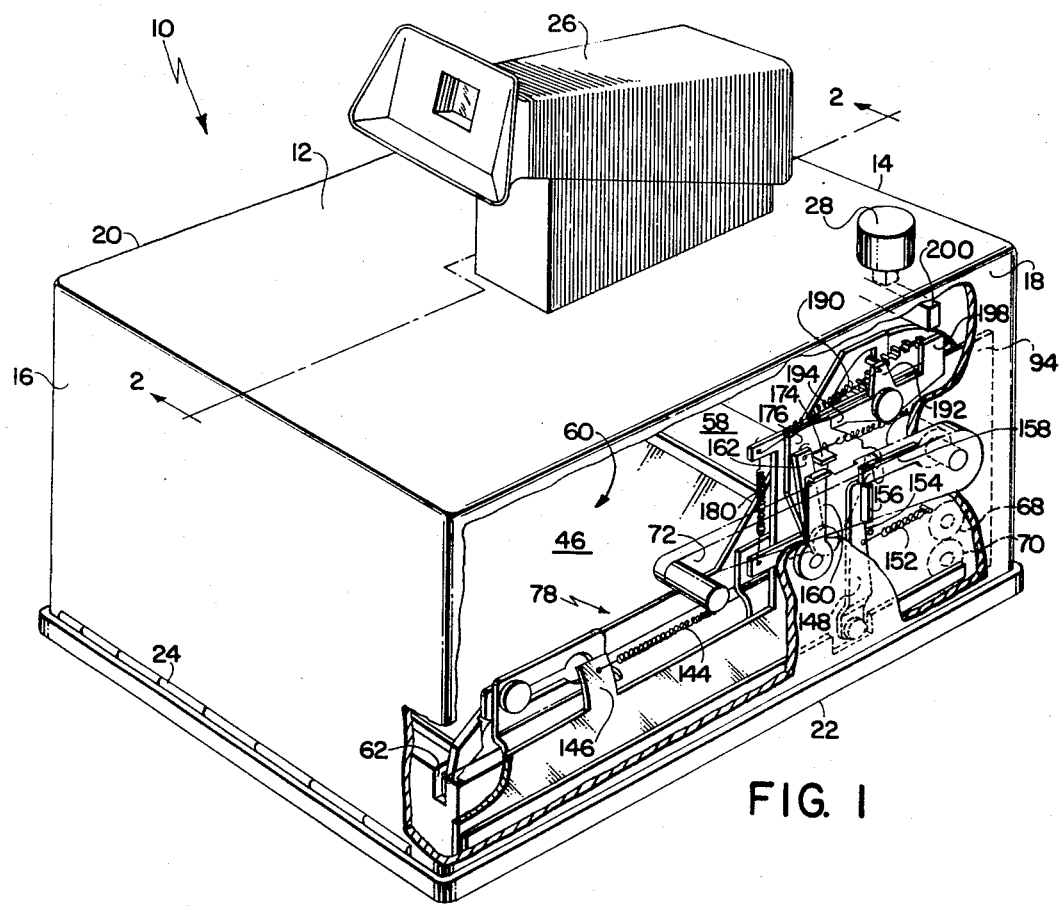
FIG. 1 is a perspective view, partly in section of photographic apparatus embodying the instant invention.
Figure 2:
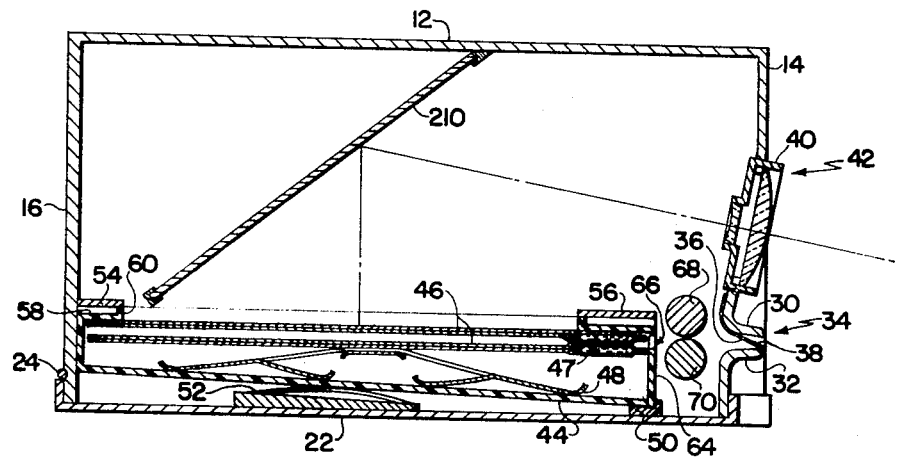
FIG. 2 is an elevational view taken generally along the line 2—2 of FIG. 1.

Reference is now made to FIG. 1 of the drawings wherein is shown photographic apparatus in the form of a camera 10 of the self-developing type. Camera 10 includes a housing defined by a top wall 12, depending side walls 14, 16, 18 and 20, and a bottom wall 22 which is pivotally connected to side wall 16 by a piano-type hinge 24 and which functions as a loading door. Extending upwardly from top wall 12 are a conventional rangefinder and/or viewfinder 26 and a shutter release button 28. Wall 14 is formed with a pair of spaced, outwardly directed flanges 30 and 32 (see FIG. 2) which extend substantially from wall 18 to wall 20 to define an exit slot 34 through which a film unit may exit from the camera. An elongated strip 36 of resilient opaque material is attached at one end to an interior surface of wall 14 and has its free end 38 in engagement with flange 34. Resilient strip 36 extends across the entire length of slot 34 to prevent light from entering the interior of the camera via the slot 34. Wall 14 further includes an opening 40 for receiving a lens and shutter assembly 42.

Camera 10 is adapted to receive a film assemblage including a cassette 44 having therein a plurality of thin, discrete and flexible film units 46 (only two being shown) and a resilient pressure plate 48. The film assemblage is located in position for exposure of the foremost film unit by an angle bracket 50 and spring 52 mounted on the interior surface of wall 22, spring 52 urging the film assemblage against support members 54 and 56. Cassette 44 includes a forward wall 58 having an exposure aperture 60, and an opening 62 (see FIG. 1) therein for receiving a film engaging member as will be more fully explained hereinafter. A leading end wall 64 of the cassette has an exit opening 66 therein which is dimensioned to allow the passage therethrough of a single film unit as it is advanced into the bite of a pair of pressure-applying members 68 and 70, herein shown as a pair of rollers.

The camera is provided with a unique manually operable film-advancing apparatus for moving a film unit, subsequent to exposure, from the cassette 44, through the rollers 68 and 70, and out exit slot 34 in the camera. Specifically, the film-advancing apparatus includes a pair of rollers 68 and 70, manually operable means in the form of a crank 72 drivingly coupled to roller 68 by a drive gear 74 and a driven gear 76 fixedly attached to one end of roller 68, and the film-advancing means 78. Crank 72 is pivotally connected to an exterior surface of wall 18 by a shaft 80 which extends through an opening 82 in wall 18. Shaft 80 includes a portion 84 which is adapted to receive a collar 86 having a set screw 88 for securing crank 72 against movement away from wall 18. Shaft 80 also includes a portion 90 of reduced diameter which extends through (1) an opening 92 in a support plate 94, (2) an opening 96 in drive gear 74, (3) an opening 98 in a plate 100, and (4) through an opening 102 in a cam 104. Mounted adjacent to and in contact with the peripheral surface of cam 104 is one end 106 of a shutter recocking arm (only a portion being shown) which is pivotally intermediate its ends to the camera and has its other end connected to the blades of the lens and shutter assembly 42 such that upward and downward movement of end 106 moves the shutter blades into a cocked position. From the foregoing it can be seen that counter-clockwise rotation (as viewed in FIG. 3) of crank 72 will rotate drive gear 74 and cam 104 in a similar direction. Rotation of drive gear 74 in the manner described is transferred to roller 68 via gear 76, mounted on a shaft 69, to rotate roller 68 in a clockwise direction. Rotation of cam 104 in the manner described is effective to rock end 106 of the shutter recocking arm (end 106 being in engagement with portion 108 of cam 106 at the start of the cycle) to recock the blades of the shutter.

Figure 3:
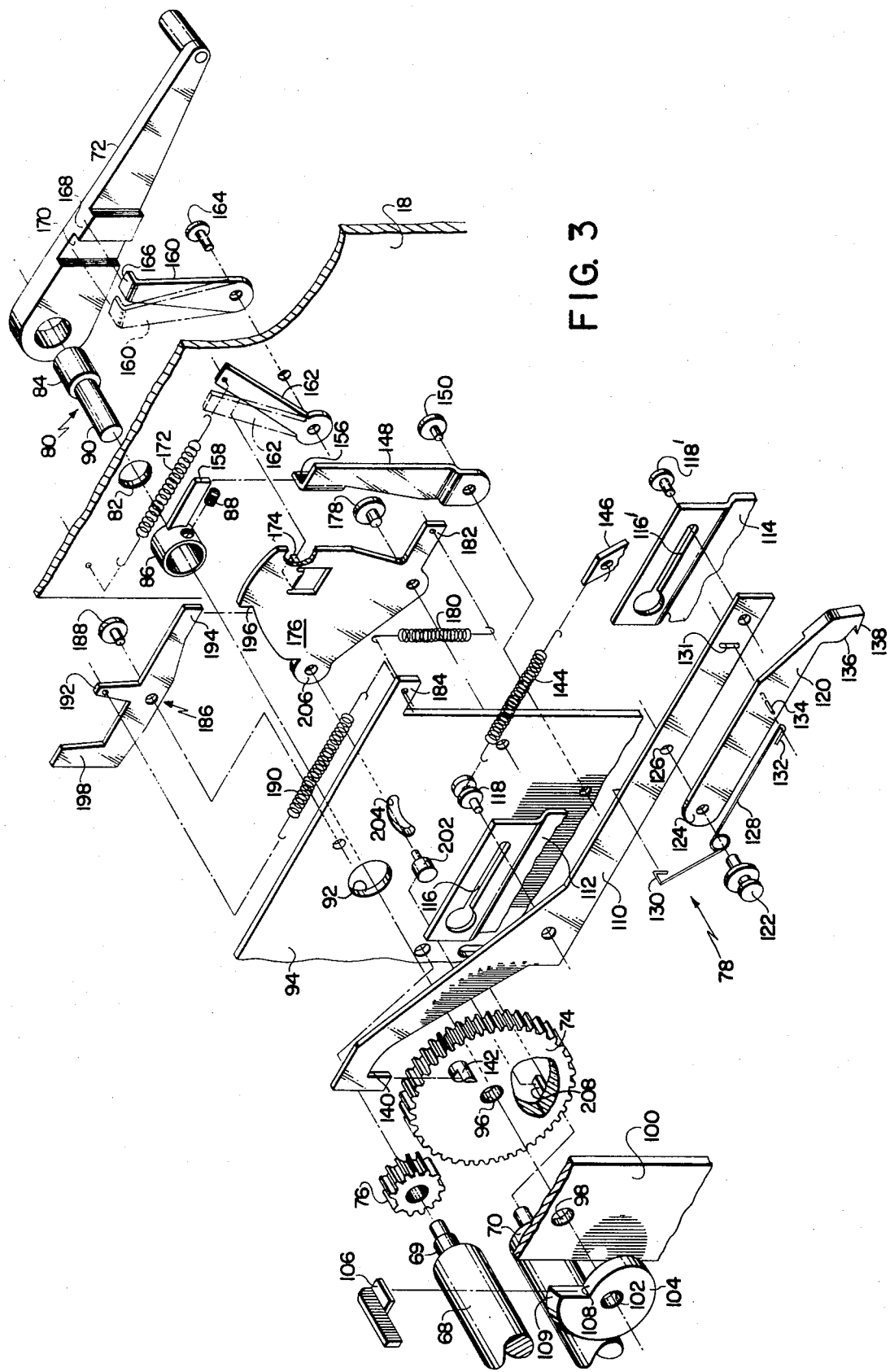
FIG. 3 is an enlarged exploded view, in perspective, of components of the instant invention.

Counterclockwise rotation of crank 72 (as viewed in FIG. 3) is also effective to move a film-advancing means 78 toward the rollers 68 and 70. As shown in FIG. 3, film-advancing means 78 includes an elongated support member 110 mounted on a pair of fixed support brackets 112 and 114 for reciprocating movement via a slot and rivet arrangement 116, 118, 116' and 118'. A film-engaging member 120 is pivotally coupled to one end of support member 110 by a rivet 122 extending through holes 124 and 126 in the film-engaging member and support member. The film-engaging member is biased in a clockwise direction by a spring 128 located on the shaft of rivet 122. The spring includes a first end 130 attached to support member 110 and a second end 132 attached to one end of a pin 134 extending through film-engaging member 120. The other end of pin 130 rides in a slot 131 in support member 110 for limiting rotation of film-engaging member in a clockwise direction. Film-engaging member 120 includes a first portion 136 which is adapted to engage a top surface of a film unit and a second portion 138 which is adapted to engage the film unit along its trailing end. The distance between the end of portion 138 and portion 136 is such that the film-engaging member can engage only one film unit, i.e., the foremost film unit, at a time. The other end of elongated support member 110 is provided with a recess 140 for receiving a pin 142 mounted on a face of drive gear 74.

At the start of each cycle, pin 142 is located in recess 140. Initial rotation of crank 72 in a counterclockwise manner (as viewed in FIG. 3) rotates gear 74 and pin 142 in a similar manner thereby moving elongated support member 110 and film-engaging member 120 to the left (as viewed in FIG. 3) to advance the foremost film unit 46 into the bite of rollers 68 and 70. After pin 142 has been rotated through a predetermined angle, it leaves recess 140 thereby allowing the film-advancing means 76 to be returned to its original position (as shown in FIG. 1) by a spring 144 having one end attached to a lug 146 on plate 94 and its other end attached to rivet 118. As gear 74 completes one revolution, pin 142 moves back into recess 140 in preparation for the next cycle.

Crank 72 is provided with means for initially preventing rotation of the crank in the wrong direction, i.e., in a clockwise direction as viewed in FIG. 3. These means take the form of a stop 148 pivotally secured to wall 94 by rivet 150 and having suitable means such as a spring 152 and stop pin 154 (see FIG. 1) for resiliently biasing stop 148 in a clockwise direction into the position shown in FIG. 1. Stop 154 includes an outwardly turned flange 156 which is positioned to engage a bottom surface of an arm 158 extending from collar 86 to prevent counterclockwise rotation of crank 72 from the position shown in FIG. 1. From an inspection of FIG. 1 it can be seen that stop 148 does not prevent clockwise rotation of crank 72, i.e., as crank 72 approaches the completion of one revolution in a clockwise direction, arm 158 rotates into engagement with the face of flange 156 and cams it and stop 148 in a counterclockwise direction against the bias of spring 152 until arm 158 reaches a substantially horizontal position wherein stop 148 moves back under arm 158. Alternatively, stop 148 and arm 158 could be replaced by a conventional one-way clutch which would prevent rotation of crank 72 in a counterclockwise direction, as viewed in FIG. 1.

The photographic apparatus further includes disenabling means movable from a first position in which it prevents rotation of crank 72 in a direction to advance a film unit from the cassette and a second position wherein the crank may be rotated. The disenabling means includes first and second levers 160 and 162 pivotally attached to opposite sides of wall 18 by a rivet 164 such that movement of arm 162 will produce a similar movement of arm 160. Stated another way, rivet 164 couples arms 160 and 162 together for movement between a first operative position, shown in solid lines in FIG. 3, wherein a flange 166 on arm 160 is in position to engage a land 168 on crank 72 to prevent rotation of crank 72 in a direction to move a film unit out of the cassette 44, and a second inoperative position, shown in broken lines in FIG. 3, wherein flange 166 is in alignment with a groove 170 in crank 72 and may be rotated to advance the film unit. A spring 172 is attached at one end to arm 162 and at its other end to wall 18 for biasing the disenabling means toward the inoperative position. Spring 172 functions as a means responsive to actuation of the shutter release button 28 for moving the disenabling means to the broken line position. When crank 72 is located in a horizontal position, as shown in FIGS. 1 and 3, arms 160 and 162 are held in the solid line position by the engagement between arm 162 and a tab 174 extending outwardly from a plate 176. Plate 176 is pivotally connected to support plate 94 by rivet 178. Plate 176 is biased in a clockwise direction, as viewed in FIG. 1, by a spring 180 having one end attached to plate 176 at 182 and its other end attached at 184 to support plate 94, but is maintained in the position shown by a latch 186. Latch 186 is pivotally mounted on support plate 94 by a rivet 188 and is biased in a counterclockwise direction (as viewed in FIG. 1) by a spring 190 having one end attached to an upwardly extending arm 192 and its other end attached at 184 to support plate 94. Latch 186 includes a first end 194 which is adapted to be positioned within a recess 196 in plate 176 for preventing clockwise rotation of plate 176 under the influence of spring 180, and a second end 198 positioned for engagement with a shutter release arm 200. With reference to FIG. 1, it can be seen that downward movement of shutter release button 28 moves the shutter release arm 200 downwardly to actuate the shutter and expose the foremost film unit. Downward movement of shutter release arm 200 moves it into engagement with end 198 of latch 186 to pivot the latter in a clockwise manner. Rotation of latch 186 in the manner just described moves end 194 of latch 186 out of recess 196 thereby allowing spring 180 to pivot plate 176 in a clockwise manner. As plate 176 rotates in a clockwise manner (as viewed in FIG. 1), arm 162, under the bias of spring 172, follows tab 174 until flange 166 on arm 160 moves to the broken line position shown in FIG. 3, i.e., flange 166 is in alignment with recess 170. At this point, a pin 202, mounted in a slot 204 in support plate 94 and attached at 206 to plate 176, bottoms out in the slot 204. After crank 76 has been rotated in a clockwise manner, as viewed in FIG. 1, a number of degrees sufficient for flange 166 to pass through recess 170, the arm 160 is automatically moved back into its operative position, i.e., the solid line position wherein flange 166 will engage land 168 as the crank reaches the end of one complete revolution. The structure for moving arm 160 back to the solid line position includes a pin 208 extending outwardly from one face of drive gear 74. As crank 72 rotates gear 74, pin 208 is rotated into engagement with pin 202. Further rotation of gear 74 results in pin 208 moving pin 202 and its attached plate in a clockwise manner, as seen in FIG. 3, until end 194 of latch 186 enters the recess 196 in plate 176. During this movement tab 174 moves the arm 162 and arm 160 back into the solid line positions.

OPERATION

At the beginning of each exposure cycle, the various parts of the camera are in the positions shown in FIG. 1, and a foremost film unit 46, which may be of the type shown and described in U.S. Pat. No. 3,415,644, is located in position for exposure with its trailing end located adjacent the film-engaging member 120 and its leading end in alignment with exit opening 66. Depression of shutter release button 28 moves shutter release arm 200 downwardly to release the blades of the shutter and expose the foremost film unit 46 via light reflected by a mirror 210. It will be noted that prior to actuation of the shutter release button 28 the crank 72 could not be rotated because of the interference set up by arm 148 and the flange 166 on arm 160. As shutter release arm 200 moves downwardly, it engages end 198 of latch 186 and pivots it in a clockwise direction, as viewed in FIG. 1, thereby moving end 194 of latch 186 out of recess 196 in plate 176. Once end 194 has been moved out of recess 196, spring 180 pivots plate 176 in a clockwise manner. This latter movement of plate 176 allows arms 160 and 162 to be pivoted to the broken line position, i.e., their inoperative position, under the influence of spring 172 thereby moving flange 166 on arm 160 out of latching engagement with land 168 and into alignment with recess 170 to allow rotation of crank 72 in a clockwise manner, as viewed in FIG. 1. The crank 72 is then rotated, as described, to simultaneously drive the film-advancing means 78 and the roller 68. As the drive of crank 72 is transmitted to the film-advancing means via the aforementioned cooperation between pin 142 on the rotating drive gear 74 and recess 140, film-engaging member 120 drivingly engages the trailing end of the exposed film unit and advances it, leading end first, through exit opening 66 in cassette 44 and into the bite of rollers 68 and 70.

As noted above, the leading end of the exposed film unit is located in alignment with exit opening 66 and, for that reason, should not be deflected by the engagement of the film-engaging member to a position wherein it is out of alignment with the exit opening. Accordingly, in order to minimize any deflection of the leading end of the exposed film unit, the exposed film unit is engaged at its trailing end.

When the exposed film unit enters the bite of rollers 68 and 70 the rotation of roller 68 is transferred, through the film unit, to roller 70. As the leading end of the exposed film unit enters the bite of the rollers, pin 142 leaves recess 140 and the film-advancing means 78 is returned to its original position by spring 144. The rotating rollers 68 and 70 advance the exposed film unit toward the exterior of the camera while simultaneously rupturing a container of processing liquid 47 attached near the leading end of the film unit and spreading the contents thereof across a photosensitive element of the exposed film unit to initiate a diffusion transfer process. The gear ratio between gears 74 and 76 and the diameter of rollers 68 and 70 are selected such that the rollers 68 and 70 will advance the exposed film unit at a rate at least equal to that at which it was previously being advanced by the film-advancing means 78 thereby preventing any buckling of the film unit between the time that the leading end of the film unit enters the bite of rollers 68 and 70 and when the trailing end moves out of engagement with the film-advancing means 78. Upon leaving the bite of the rollers, the leading end of the film unit engages the opaque strip of resilient material 38 and deflects it upwardly as the film unit moves through exit slot 34. Strip 34 cooperates with flange 32 to releasably hold the film unit near its trailing end, after it moves out of engagement with the rollers 68 and 70, until the photographer is ready to remove it. During the advancement of the exposed film unit by the rollers 68 and 70, pin 208 on drive gear 74 is rotated into engagement with pin 202 to rotate plate 176 in a counterclockwise direction, against the bias of spring 180, until end 194 of latch 186 enters recess 196. The rotation of plate 176 is transferred to arm 162 via flange 174 to move the arms 162 and 160 back into the solid line position wherein flange 166 on arm 160 will be located in position to engage the land 168 on crank 72 as the latter reaches the end of one complete revolution. Also, the above described rotation of the crank is transferred by cam 104 to shutter recocking arm 106 thereby recocking the shutter. The recocking arm 106 is pivoted upwardly until the arm reaches the high point 109 on the cam. Thereafter, the high point 109 is rotated out of engagement with the recocking arm 106 and the latter, under the bias of a spring, drops downwardly onto portion 108 of cam 104 and the shutter is now ready for another exposure. During the end of the cycle, i.e., as crank 72 approaches the end of one complete revolution, arm 158 engages the flange 156 on arm 148 and cams the latter in a counterclockwise direction (as viewed in FIG. 1) until arm 158 has reached a position in which arm 148 can return to the position shown in FIG. 1. In this latter position, rotation of crank 72 in a counterclockwise direction is prevented by the engagement betweem arm 158 and the top edge of flange 156, and clockwise rotation of crank 72 is prevented by the engagement between flange 166 and land 168. Once disenabled, crank 72 cannot be rotated to advance the next film unit from the cassette until flange 166 moves into alignment with recess 170 in response to actuation of the shutter release button.

From the foregoing it can be seen that there has been disclosed a novel, inexpensive and highly efficient, manually operable, film-advancing apparatus for use with cameras of the self-developing type. The structural cooperation between the various parts of the apparatus is such that the simple act of rotating a hand crank, subsequent to photographically exposing a film unit, is all that is required to deliver the exposed film unit to the photographer in a condition wherein no further physical operations are necessary in order for the subject photographed to be viewed within a relatively short period of time, e.g., one minute. The operation of the film-advancing apparatus is substantially foolproof in that the crank cannot be rotated until the foremost film unit in the cassette has been exposed, thereby obviating the possibility of advancing a non-exposed film unit from the camera, and, after the exposed film unit has been advanced to the exterior of the camera, the crank is disenabled before it can advance a second film unit out of its exposure position. Rotation of the crank through one cycle, i.e., one revolution, is effective to (1) drive the film-advancing means, (2) drive at least one roller of the pressure-applying means, (3) recock the camera's shutter, and (4) move a disenabling means into position to limit rotation of the crank to one cycle per exposure.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Photographic apparatus for use with a film assemblage of the type including a cassette having means defining an exit in one end thereof through which a film unit is adapted to be moved subsequent to exposure, an opening adjacent an opposite end of said cassette and an exposure aperture, a plurality of discrete film units located within said cassette in stacked relation with a foremost one of said film units being adapted to be urged into a position adjacent said exposure aperture with a first end of said film unit in alignment with said exit, a second end of said film unit opposite said first end being in alignment with said opening and a photosensitive area of said film unit being located in alignment with said exposure aperture, said photographic apparatus comprising:
- means for locating said film assemblage in said photographic apparatus in position for exposure of said foremost film unit;
- means including a shutter release for exposing said foremost film unit through said exposure aperture in said cassette;
- film-advancing means mounted in said photographic apparatus and adapted to extend into said opening in said cassette to drivingly engage said foremost film unit near said second end thereof and thereby move said foremost film unit, subsequent to exposure, through said exit in said cassette;
- pressure-applying means mounted in said apparatus and adapted to drivingly engage said first end of said foremost film unit after it moves through said exit and spread a processing liquid across a photosensitive element of said film unit;
- manually operable means, including a crank, engageable with said film-advancing means and said pressure-applying means for driving said film-advancing means and said pressure-applying means simultaneously to continuously move said foremost film unit from said cassette and between said pressure-applying means and for driving said pressure-applying means at a rate sufficient to at least maintain the rate of movement of said foremost film unit as it is being advanced by said film-advancing means;
- disenabling means; and
- means for moving said disenabling means between a first operative position in which it prevents rotation of said crank to advance said foremost film unit from said cassette and a second inoperative position wherein said crank may be rotated to advance said foremost film unit from said cassette, said moving means includes means responsive to actuation of said shutter release for moving said disenabling means from said first operative position to said second inoperative position, whereby rotation of said crank to advance said foremost film unit from said cassette is possible only after actuation of said shutter release.

2. Photographic apparatus as defined in claim 1 wherein said moving means moves said disenabling means from said second inoperative position to said first operative position prior to said film-advancing means moving a succeeding film unit from said cassette, whereby said crank is prevented from driving said film-advancing means to advance said succeeding film unit until a subsequent actuation of said shutter release.

3. Photographic apparatus for use with a film assemblage of the type including a cassette having means defining an exit in one end thereof through which a film unit is adapted to be moved subsequent to exposure, an opening adjacent an opposite end of said cassette and an exposure aperture, a plurality of discrete film units located within said cassette in stacked relation with a foremost one of said film units being adapted to be urged into a position adjacent said exposure aperture with a first end of said film unit in alignment with said exit, a second end of said film unit opposite said first end being in alignment with said opening and a photosensitive area of said film unit being located in alignment with said exposure aperture, said photographic apparatus comprising:
- means for locating said film assemblage in said photographic apparatus in position for exposure of said foremost film unit;
- shutter means for exposing said foremost film unit through said exposure aperture in said cassette;
- film-advancing means mounted in said photographic apparatus and adapted to extend into said opening in said cassette to drivingly engage said foremost film unit near said second end thereof and thereby move said foremost film unit, subsequent to exposure, through said exit in said cassette;
- pressure-applying means mounted in said apparatus and adapted to drivingly engage said first end of said foremost film unit after it moves through said exit and spread a processing liquid across a photosensitive element of said film unit;
- manually operable means, including a crank, engageable with said film-advancing means and said pressure-applying means for driving said film-advancing means and said pressure-applying means to continuously move said foremost film unit from said cassette and between said pressure-applying means; and
- means engageable with said shutter means and responsive to actuation of said manually operable means for cocking said shutter means subsequent to exposure of said foremost film unit, said means for cocking said shutter means includes a cam mounted for rotation by said crank.

4. Photographic apparatus for use with a film assemblage of the type including a cassette having means defining an exit in one end thereof through which a film unit is adapted to be moved subsequent to exposure, an opening adjacent an opposite end of said cassette and an exposure aperture, a plurality of discrete film units located within said cassette in stacked relation with a foremost one of said film units being adapted to be urged into a position adjacent said exposure aperture with a first end of said film unit in alignment with said exit, a second end of said film unit opposite said first end being in alignment with said opening and a photosensitive area of said film unit being located in alignment with said exposure aperture, said photographic apparatus comprising:
- means for locating said film assemblage in said photographic apparatus in position for exposure of said foremost film unit;
- shutter means including a release for exposing said foremost film unit through said exposure aperture in said cassette;
- film-advancing means mounted in said photographic apparatus and adapted to extend into said opening in said cassette to drivingly engage said foremost film unit near said second end thereof and thereby move said foremost film unit, subsequent to exposure, through said exit in said cassette;
- pressure-applying means mounted in said apparatus and adapted to drivingly engage said first end of said foremost film unit after it moves through said exit and spread a processing liquid across a photosensitive element of said film unit;

manually operable means engageable with said film-advancing means and said pressure-applying means for driving said film-advancing means and said pressure-applying means to continuously move said foremost film unit from said cassette and between said pressure applying means; and disenabling means cooperable with said manually operable means for preventing the removal of more than one film unit for each actuation of said shutter release.

5. Photograhic apparatus as defined in claim 4 wherein said manually operable means include a crank pivotally coupled to said photographic apparatus and said disenabling means is mounted for movement into the path of rotation of said crank for limiting rotation thereof.

6. Photographic apparatus as defined in claim 5 wherein said disenabling means is movable in response to actuation of said shutter release to a position which permits rotation of said crank to move said foremost film unit out of said container and into engagement with said pressure-applying means.

7. Photographic apparatus for use with a film assemblage of the type including a cassette having means defining an exit in one end thereof through which a film unit is adapted to be moved subsequent to exposure, an opening adjacent an opposite end of said cassette and an exposure aperture, a plurality of discrete film units located within said cassette in stacked relation with a foremost one of said film units being adapted to be urged into a position adjacent said exposure aperture with a first end of said film unit in alignment with said exit, a second end of said film unit opposite said first end being in alignment with said opening and a photosensitive area of said film unit being located in alignment with said exposure aperture, said photographic apparatus comprising:

means for locating said film assemblage in said photographic apparatus in position for exposure of said foremost film unit;

means for exposing said foremost film unit through said exposure aperture in said cassette;

film-advancing means mounted in said photographic apparatus and adapted to extend into said opening in said cassette to drivingly engage said foremost film unit near said second end thereof and thereby move said foremost film unit, subsequent to exposure, through said exit in said cassette;

pressure-applying means mounted in said apparatus and adapted to drivingly engage said first end of said foremost film unit after it moves through said exit and spread a processing liquid across a photosensitive element of said film unit; and manually operable means engageable with said film-advancing means and said pressure-applying means for driving said film-advancing means and said pressure-applying means to continuously move said foremost film unit from said cassette and between said pressure-applying means, said manually operable means includes rotatable means having means thereon movable into and out of driving engagement with said film-advancing means during each revolution of said rotatable means, said means being movable out of driving engagement with said film-advancing means when said foremost film unit is in engagement with said pressure-applying means.

8. Photographic apparatus for use with a film assemblage of the type including a cassette having means defining an exit in one end thereof through which a film unit is adapted to be moved subsequent to exposure, an opening adjacent an opposite end of said cassette and an exposure aperture, a plurality of discrete film units located within said cassette in stacked relation with a foremost one of said film units being adapted to be urged into a position adjacent said exposure aperture with a first end of said film unit in alignment with said exit, a second end of said film unit opposite said first end being in alignment with said opening and a photosensitive area of said film unit being located in alignment with said exposure aperture, said photographic apparatus comprising:

means for locating said film assemblage in said photographic apparatus in position for exposure of said foremost film unit;

means for exposing said foremost film unit through said exposure aperture in said cassette;

film-advancing means mounted in said photographic apparatus and adapted to extend into said opening in said cassette to drivingly engage said foremost film unit near said second end thereof and thereby move said foremost film unit, subsequent to exposure, through said exit in said cassette;

pressure-applying means mounted in said apparatus and adapted to drivingly engage said first end of said foremost film unit after it moves through said exit and spread a processing liquid across a photosensitive element of said film unit;

manually operable means engageable with said film-advancing means and said pressure-applying means for driving said film-advancing means and said pressure-applying means to continuously move said foremost film unit from said cassette and between said pressure-applying means; and means for predeterminedly locating said manually operable means after said foremost film unit has moved out of engagement with said pressure-applying means.

9. Photographic apparatus as defined in claim 8 wherein said locating means prevents actuation of said manually operable means until said foremost film unit has been exposed.

10. Photographic apparatus for use with a film assemblage of the type including a cassette having means defining an exit in one end thereof through which a film unit is adapted to be moved subsequent to exposure, an opening adjacent an opposite end of said cassette and an exposure aperture, a plurality of discrete film units located within said cassette in stacked relation with a foremost one of said film units being adapted to be urged into a position adjacent said exposure aperture with a first end of said film unit in alignment with said exit, a second end of said film unit opposite said first end being in alignment with said opening and a photosensitive area of said film unit being located in alignment with said exposure aperture, said photographic apparatus comprising:

means for locating said film assemblage in said photographic apparatus in position for exposure of said foremost film unit;

means for exposing said foremost film unit through said exposure aperture in said cassette;

film-advancing means mounted in said photographic apparatus and adapted to extend into said opening in said cassette to drivingly engage said foremost film unit near said second end thereof and thereby move said foremost film unit, subsequent to exposure, through said exit in said cassette;

pressure-applying means mounted in said apparatus and adapted to drivingly engage said first end of said foremost film unit after it moves through said exit and spread a processing liquid across a photosensitive element of said film unit;

manually operable means engageable with said film-advancing means and said pressure-applying means for driving said film-advancing means and said pressure-applying means to continuously move said foremost film unit from said cassette and between said pressure-applying means; and means for preventing movement of said foremost film unit by said film-advancing means until said foremost film unit has been exposed by actuation of said exposing means.

* * * * *